US008798202B2

(12) United States Patent
Rouquette-Leveil et al.

(10) Patent No.: US 8,798,202 B2
(45) Date of Patent: Aug. 5, 2014

(54) METHOD AND APPARATUS USING SOUNDING PPDUS TO PROVIDE RANGE EXTENSION TO IEEE 802.11N SIGNALS

(75) Inventors: Stephanie Rouquette-Leveil, Massy (FR); Marc Bernard De Courville, Paris (FR); Patrick Labbe, Antony (FR)

(73) Assignee: Motorola Mobility LLC, Chicago, IL (US)

( * ) Notice: Subject to any disclaimer, the term of this patent is extended or adjusted under 35 U.S.C. 154(b) by 842 days.

(21) Appl. No.: 12/615,860

(22) Filed: Nov. 10, 2009

(65) Prior Publication Data
US 2010/0111220 A1 May 6, 2010

Related U.S. Application Data

(63) Continuation of application No. PCT/US2008/066483, filed on Jun. 11, 2008.

(30) Foreign Application Priority Data

Jun. 15, 2007 (EP) ..................................... 07290745

(51) Int. Cl.
*H04L 27/00* (2006.01)
*H04L 1/06* (2006.01)
(52) U.S. Cl.
CPC ....................... *H04L 1/06* (2013.01)
USPC ........................................................ 375/299
(58) Field of Classification Search
CPC ....... H04L 1/0618; H04B 7/06; H04B 7/0671
USPC .......................................... 375/295, 299, 316
See application file for complete search history.

(56) References Cited

U.S. PATENT DOCUMENTS

| 7,039,412 B2 | 5/2006 | Sandhu et al. |
| 2002/0101825 A1 | 8/2002 | Beck et al. |

(Continued)

FOREIGN PATENT DOCUMENTS

WO    2006029050 A2    3/2006

OTHER PUBLICATIONS

Coffey et al, IEEE P802.11 Wireless LANs, Joint Proposal: High Throughput Extension to the 802.11 Standard: MAC, Jan. 13, 2006, 82 pages.*

(Continued)

*Primary Examiner* — Kevin M Burd
(74) *Attorney, Agent, or Firm* — Leydig, Voit & Mayer, Ltd.

(57) ABSTRACT

A wireless transmitter includes a stream parser for generating a plurality of spatial streams from a digital signal and a space time block coder (STBC) for mapping each of the spatial streams to a plurality of space-time streams that each include data and a preamble for estimating a channel transfer function. The transmitter also includes a spatial mapper for spatially expanding each of the space-time streams by applying a spatial expansion matrix to data and to first training symbols used in the preamble to probe a channel experienced by the data and by applying an extension matrix to second training symbols used in the preamble to probe at least one additional dimension of the channel to enable use of beamforming to achieve range extension The spatial expansion matrix and the extension matrix form an overall matrix that has at least two orthogonal columns with different norms. The wireless transmitter also includes an analog front end for modulating the spatially expanded space-time streams onto a wireless carrier.

19 Claims, 5 Drawing Sheets

(56) References Cited

U.S. PATENT DOCUMENTS

| | | | |
|---|---|---|---|
| 2004/0185792 | A1 | 9/2004 | Alexiou et al. |
| 2004/0253926 | A1 | 12/2004 | Gross |
| 2005/0078761 | A1 | 4/2005 | Hottinen et al. |
| 2005/0147183 | A1 | 7/2005 | Willink |
| 2005/0157807 | A1 | 7/2005 | Shim et al. |
| 2005/0181728 | A1 | 8/2005 | Hansen et al. |
| 2005/0190724 | A1 | 9/2005 | Hansen et al. |
| 2005/0232370 | A1 | 10/2005 | Trachewsky et al. |
| 2006/0007908 | A1 | 1/2006 | Hosur et al. |
| 2006/0013259 | A1 | 1/2006 | Chari et al. |
| 2006/0029146 | A1 | 2/2006 | Catreux et al. |
| 2006/0056443 | A1 | 3/2006 | Tao et al. |
| 2006/0291544 | A1* | 12/2006 | Fischer et al. ............ 375/219 |
| 2007/0008219 | A1 | 1/2007 | Hoffmann et al. |
| 2007/0064830 | A1 | 3/2007 | Choi et al. |
| 2007/0127587 | A1 | 6/2007 | Ouyang et al. |

OTHER PUBLICATIONS

Office Action, Korean App. No. 10-2009-7026068 (English Translation and Foreign Text), Mar. 18, 2011.

"HT PHY Specification," Enhanced Wireless Consortium Publication, V 1.27, Dec. 23, 2005, 67 pages.

"MIMO and 802.11n," Industrial technology Research Institute, Sep. 22, 2005, 18 pages.

Yukimasa Nagai et al., "324 Mbps WLAN Equipment with MAC Frame Aggregation for High MAC-SAP Throughput," Journal of Communication, vol. 1, No. 5, Aug. 2006, pp. 1-8.

James Michael Wilson, "The Next Generation," www.wirelessdesignmag.com, vol. 01/05, pp. 16-20, date unknown, but prior to the filing date of the instant application.

James Zyren, "The WWiSE Proposal for the 802.11n Standard," 8 pages, date unknown, but prior to the filing date of the instant application.

James M. Wilson, "Quadrupling Wi-Fi speeds with 802.11n," Aug. 9, 2004, 11 pages. http://www.deviceforge.com/articles/AT5096801417.html.

Adrian Stephens et al., IEEE P802.11 Wireless LANs, Joint Proposal: High throughput extension to the 802.11 Standard: MAC, Jan. 13, 2006, 25 pages.

Jim Petranovich et al., Joint Proposal PHY Overview, Jan. 10, 2006, 40 pages.

TGn Sync, An IEEE 802.11n Protocol Standard Proposal Alliance, PHY Overview, Jun. 2004, 42 pages.

PCT International Search Report and Written Opinion for PCT/US08/66483. Issued Aug. 5, 2008.

European Patent Office, "Extended Search Report" for European Patent Application No. 07290745.4 dated Oct. 29, 2007, 9 pages.

* cited by examiner

| NTX \ NSTS | 3Tx | | | | 4Tx | | | |
|---|---|---|---|---|---|---|---|---|
| | $q_D$ | $q_E$ | $Q$ | $Q^{-1}$ | $q_D$ | $q_E$ | $Q$ | $Q^{-1}$ |
| 2STS | $D_{1,1,e^{j\theta_k}} \begin{bmatrix} 1 & 0 \\ 0 & 1 \\ 1 & 0 \end{bmatrix} \sqrt{\frac{2}{3}}$ | $D_{1,1,e^{j\theta_k}} \begin{bmatrix} -1 & 0 \\ 0 & -1 \\ 1 & 0 \end{bmatrix} \frac{1}{\sqrt{2}}$ | $D_{1,1,e^{j\theta_k}} \begin{bmatrix} 1 & 0 & -1 \\ 0 & 1 & 0 \\ 1 & 0 & 1 \end{bmatrix} \sqrt{\frac{2}{3},\frac{2}{3},\sqrt{\frac{1}{2}}}$ | $D_{\frac{3}{4},\frac{3}{2},\sqrt{1}} Q^H$ | $D_{1,1,e^{j\theta_k},e^{j\theta_k}} \begin{bmatrix} 1 & 0 \\ 0 & 1 \\ 1 & 0 \\ 0 & 1 \end{bmatrix} \frac{1}{\sqrt{2}}$ | $D_{1,1,e^{j\theta_k},e^{j\theta_k}} \begin{bmatrix} -1 & 0 \\ 0 & -1 \\ 1 & 0 \\ 0 & 1 \end{bmatrix} \frac{1}{\sqrt{2}}$ | $D_{1,1,e^{j\theta_k},e^{j\theta_k}} \left( \begin{bmatrix} 1 & -1 \\ 1 & 1 \end{bmatrix} \otimes I_2 \right) \frac{1}{\sqrt{2}}$ | $Q^{-1}$ |
| | STBC/SDM | | | | STBC/SDM | | | |
| 3STS | | | | | $D_{1,1,e^{j\theta_k}} \begin{bmatrix} 1 & 0 & 0 \\ 0 & 1 & 0 \\ 0 & 0 & 1 \\ 1 & 0 & 0 \end{bmatrix} \frac{\sqrt{3}}{2}$ | $D_{1,1,e^{j\theta_k}} \begin{bmatrix} -1 & 0 & 0 \\ 0 & -1 & 0 \\ 0 & 0 & 1 \\ 1 & 0 & 0 \end{bmatrix} \frac{\sqrt{3}}{2}$ | $D_{1,1,e^{j\theta_k}} \begin{bmatrix} 1 & 0 & 0 & -1 \\ 0 & 1 & 0 & 0 \\ 0 & 0 & 1 & 0 \\ 1 & 0 & 0 & 1 \end{bmatrix} \sqrt{\frac{3}{2},\frac{\sqrt{3}}{2},2,\sqrt{\frac{1}{2}}}$ | $D_{\frac{2}{3},\frac{4}{3},\frac{4}{3},\frac{1}{3}} Q^H$ |
| | | | | | SDM | | | |

FIG. 7

- $D_{(a_1,...,a_n)} = \text{diag}(a_1,...,a_n)$ IS A DIAGONAL MATRIX
- $\theta_k = -2\pi k \Delta_F T_{CS}$ WHEN $\Delta_F$ IS THE SUBCARRIER FREQUENCY SPACING
- $F_3$ IS THE 3x3 FOURIER MATRIX, $\omega = e^{j\frac{2\pi}{3}}$
- $I_2$ IS THE 2x2 IDENTITY MATRIX
- $\otimes$ IS THE KRONECKER PRODUCT

US 8,798,202 B2

METHOD AND APPARATUS USING SOUNDING PPDUS TO PROVIDE RANGE EXTENSION TO IEEE 802.11N SIGNALS

CROSS REFERENCE TO RELATED APPLICATIONS

This application is a continuation of and claims priority to PCT Application PCT/US2008/66483, filed Jun. 11, 2008.

FIELD OF THE INVENTION

The invention relates generally to a spatial mapping operation for sounding PPDUs in an IEEE 802.11n communication system.

BACKGROUND OF THE INVENTION

In recent years, wireless data communication in domestic and enterprise environments have become increasingly commonplace and an increasing number of wireless communication systems have been designed and deployed. In particular, the use of wireless networking has become prevalent and wireless network standards such as IEEE 801.11a and IEEE 801.11 g have become commonplace.

The requirement for increasing data rates, communication capacity and quality of services has led to continued research and new techniques and standards being developed for wireless networking. One such standard is the IEEE 801.11n standard which is currently under development. IEEE 801.11n is expected to operate in the 2.4 GHz or 5 GHz frequency spectrum and promises data rates of around 100 Mbps and above on top of the MAC layer. IEEE 801.11n will use many techniques which are similar to the earlier developed IEEE 801.11a and IEEE 801.11 g standards. The standard is to a large extent compatible with many of the characteristics of the earlier standards thereby allowing reuse of techniques and circuitry developed for these. For example, as in the previous standards IEEE 801.11a and IEEE 801.11 g, IEEE 801.11n will use Orthogonal Frequency Division Multiplex (OFDM) modulation for transmission over the air interface.

The frame or packet formats employed by the IEEE 801.11 a/g/n standards can be understood with reference to the open system interconnection (OSI) model, which defines the application, presentation, session, transport, network, data link, and physical layers. The data link layer includes a logical link control (LLC) layer and a media access control layer. The MAC layer controls how to gain access to the network, and the LLC layer controls frame synchronization, flow control and error checking. The physical layer (PHY) transmits signals over the network. FIG. 1 shows the LLC, MAC and PHY layers along with the IEEE 801.11 a/g/n frames with which they are associated. As shown, each MAC service data unit (MSDU) or frame 11, received from a logic link control layer (LLC) 10, is appended with a MAC header and a frame check sequence (FCS) trailer, at the MAC layer 20, to form a MAC layer protocol data unit (MPDU) or frame 21. At the physical layer, the MPDU is received as a physical layer service data unit (PSDU) or frame 22. At the physical layer 30, a physical layer convergence procedure (PLCP) header, a PLCP preamble, and tail and pad bits are attached to the PSDU frame 22 to form a physical layer protocol data unit (PPDU) or frame 31 for transmission on the channel.

In order to improve efficiency and to achieve the high data rates, IEEE 801.11n is planned to introduce a number of advanced techniques. For example, IEEE 801.11n communication is expected to be typically based on a plurality of transmit and receive antennas. Furthermore, rather than merely providing diversity from spatially separated transmit antennas, IEEE 801.11n will utilise transmitters having at least partially separate transmit circuitry for each antenna thus allowing different sub-signals to be transmitted from each of the antennas. The receivers may receive signals from a plurality of receive antennas and may perform a joint detection taking into account the number and individual characteristics associated with each of the plurality of transmit antennas and receive antennas. Specifically, IEEE 801.11n has seen the introduction of a Multiple-Transmit-Multiple-Receive (MTMR) antenna concept which exploits Multiple-Input-Multiple-Output (MIMO) channel properties to improve performance and throughput. MIMO processing operates in conjunction with information located in PPDU frame or packet.

One class of MTMR techniques that is specified in IEEE802.11n is spatial mapping. Spatial mapping techniques include direct mapping, cyclic shift diversity, beamforming and spatial expansion techniques. In spatial expansion, space expanded symbols are transmitted from spatially separate antennas. The spatial expansion provides separate streams for each of the spatially separate antennas. More specifically, the spatial expansion or coding includes encoding a stream of symbols to provide separate encoded streams for separate antennas. Each encoded stream is distinct. For example, differential delays can be imposed upon different streams by imposing different phase rotations on the samples of each of the streams.

Spatial mapping techniques can be used to provide range extension i.e., to achieve a higher signal to noise ratio at the receiver, thus allowing data to be to be properly decoded at a larger distance from the transmitter. One way to provide range extension uses open loop processing, in which the transmitter does not have any knowledge concerning the state of the channel over which the signal is transmitted. Spatial expansion is one spatial mapping technique that employs open loop processing. Alternatively, closed loop processing may be employed, in which the receiver provides the transmitter with channel state information that can be used to further increase the signal to noise ratio of the received signal. One example of a spatial mapping technique that employs closed loop processing is beamforming.

One problem that arises when spatial mapping techniques are applied to IEEE 801.11n PPDU frames is that long range spatial expansion techniques cannot be applied to sounding PPDUs, thus limiting the range of the future transmissions using beamforming. This problem arises because sounding PPDUs do not fulfil the requirements of the IEEE 801.11n standard, which specifies that the spatial mapping matrix should be formed of orthogonal columns with the same norm.

BRIEF DESCRIPTION OF THE DRAWINGS

FIG. 7 show a number of illustrative spatial expansion schemes for use with long range sounding PPDUs.

DETAILED DESCRIPTION

As detailed below, particular multiple antenna techniques are provided for increasing the range in an IEEE 802.11n communication system. This increase is achieved by acquiring information concerning the characteristics of the channel that is being used. The multiple antenna techniques facilitate the acquisition of this channel information.

The techniques described herein can be employed on a variety of different communication methods and devices utilizing Orthogonal Frequency Division Multiplexing (OFDM). In general, OFDM is a block-oriented modulation scheme that maps a number of data constellation points onto a number of orthogonal carriers separated in frequency by BW/N, where BW is the bandwidth of the OFDM symbol and N is the number of tones in the OFDM symbol. OFDM is a technique by which data is transmitted at a high rate by modulating several low bit rate carriers in parallel rather than one single high bit rate carrier. OFDM is particularly useful in the context of Wireless Local Area Network (WLAN), Digital Video Broadcasting (DVB), High Definition Television (HDTV) as well as for Asymmetric Digital Subscriber Lines (ADSL) systems. OFDM can also be useful in satellite television systems, cable television, video-on-demand, interactive services, mobile communication devices, voice services and Internet services. The techniques will be described in the context of the IEEE 802.11n draft standard, which employ OFDM. These techniques relate generally to the PHY layer architecture. The following reference presents the MAC and PHY layer of IEEE 802.11n draft standard: "Wireless LAN Medium Access Control (MAC) and Physical Layer (PHY) specifications—Enhancements for Higher Throughput" IEEE P802.11n™/D1.10.

Figure 2:
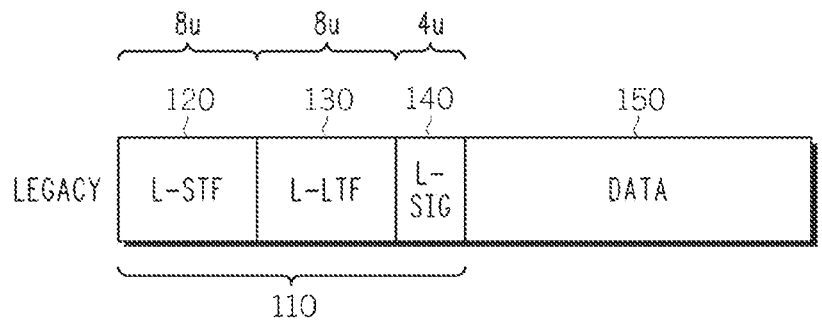
FIG. 2 shows the conventional physical layer preamble in accordance with the IEEE 802.11a/g standards.

In order to enable or facilitate reception, the standards of IEEE 802.11a/g as well as 802.11n draft standard prescribe that all data packet are preceded by a physical layer preamble which comprises known data or training symbols that facilitates receiver gain setting, synchronization and channel estimation. The physical layer preamble will be described in more detail with reference to FIG. 2, which shows a conventional frame format 100 in accordance with the IEEE 802.11a/g standards. The frame format 100 comprises a physical layer preamble 110 and a data field 150. As previously noted, in the context of the Open Systems Interconnection (OSI) reference model, the physical layer preamble 110 is a part of the PLCP preamble that is incorporated in a PPDU packet. PPDU packets are employed in the part of the physical layer referred to as the PLCP sublayer.

The preamble 110 includes a Legacy Short Training Field (L-STF) 120 that comprises ten Legacy Short Training Symbols (L-STS). These are used to detect the presence of an incoming signal and to perform initial estimations of, for example, carrier frequency offset. Thereafter, there is a Legacy Long Training Field (L-LTF) 130 comprising two Legacy Long Training Symbols (L-LTS). These OFDM training symbols are used to perform channel estimation (i.e., an estimate of the channel transfer function from the transmitting antenna to each receiving antenna). Channel estimation is employed to determine the effects that the transmission environment has on the transmitted data signals. The channel estimation procedure utilizes the long training symbols, which have a known magnitude and phase, to compensate for signal changes due to the transmission environment. The long training symbols can be analyzed to determine the effects of the environment on the transmitted signal and this information utilized to adjust the data signals appropriately. The preamble 110 also includes a Legacy SIGNAL (L-SIG) field 140. The information in the L-SIG field 140 is needed to transmit general frame format parameters, such as packet length and data rate and the details of the modulation format that is used. The Legacy Short Preamble, Long Preamble and Signal field comprise a legacy header 110. The OFDM symbols carrying the user data are located in the DATA field 150 that follows the SIGNAL field.

Figure 3:
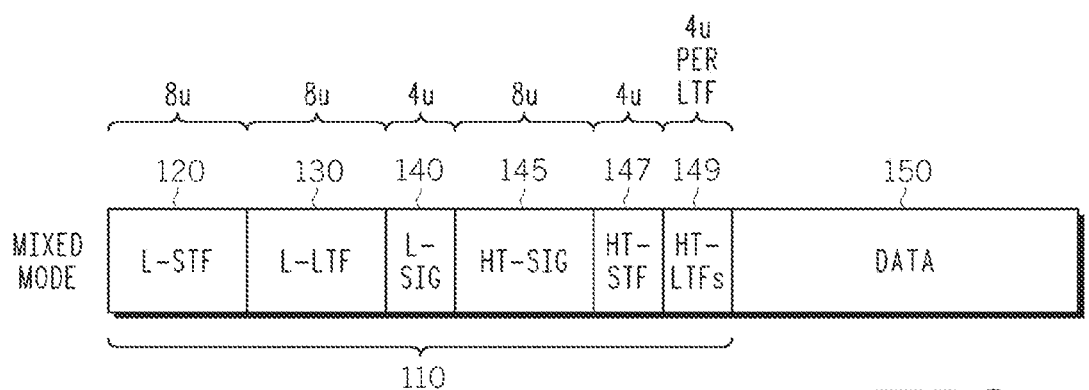
FIG. 3 shows a mixed-mode physical layer preamble in which 802.11a/g and 802.11n devices coexist.
Figure 4:
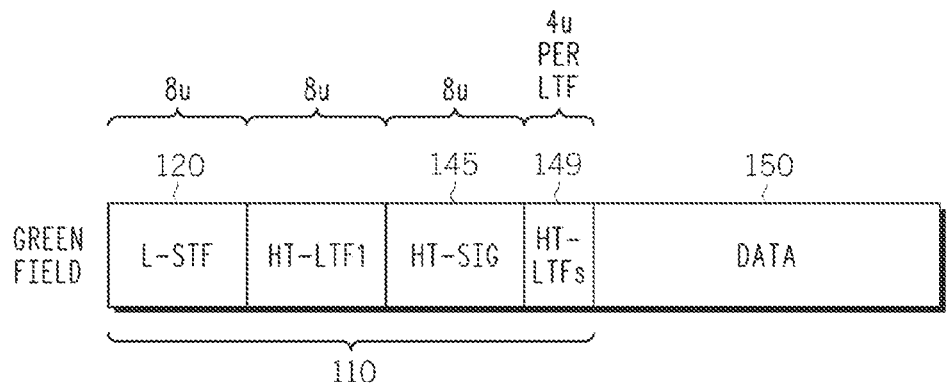
FIG. 4 shows a green field physical layer preamble in which only 802.11n devices are operable.

FIG. 3 shows a mixed-mode frame format in which 802.11a/g and 802.11n devices coexist. Similarly, FIG. 4 shows a green field frame format in which only 802.11n devices are operable. The frame format shown in FIG. 3 includes the legacy STS, LTS and SIG fields. In addition a second SIG field, denoted the High-Throughput SIG field (HT-SIG) 145, is provided, as well as a High Throughput Short Training Field (HT-STF) 147 and a High Throughput Long Training Field (HT-LTF) 149. The HT-STF 147 is used to set the AGC and for acquisition tasks when operating in a green field mode. The HT-LTF 149, which is used to provide the receiver with some knowledge of the MIMO channel, includes two parts: Data LTFs (DLTFs) that are used to measure the channel experienced by the data and to decode the data portion of the PPDU; and Extension LTFs (ELTFs) that are used to probe additional spatial dimensions of the channel which are not utilized in the data portion of the PPDU. The number of DLTFs is denoted $N_{DLTF}$ and the number of ELTFs is denoted $N_{ELTF}$. The total number of HT-LTFs, denoted $N_{LTF}$, is $$N_{LFT} = N_{DLTF} + N_{ELTF}$$

The aforementioned 802.11n draft specification currently prescribes that $N_{LTF}$ shall not exceed 5.

Figure 5:
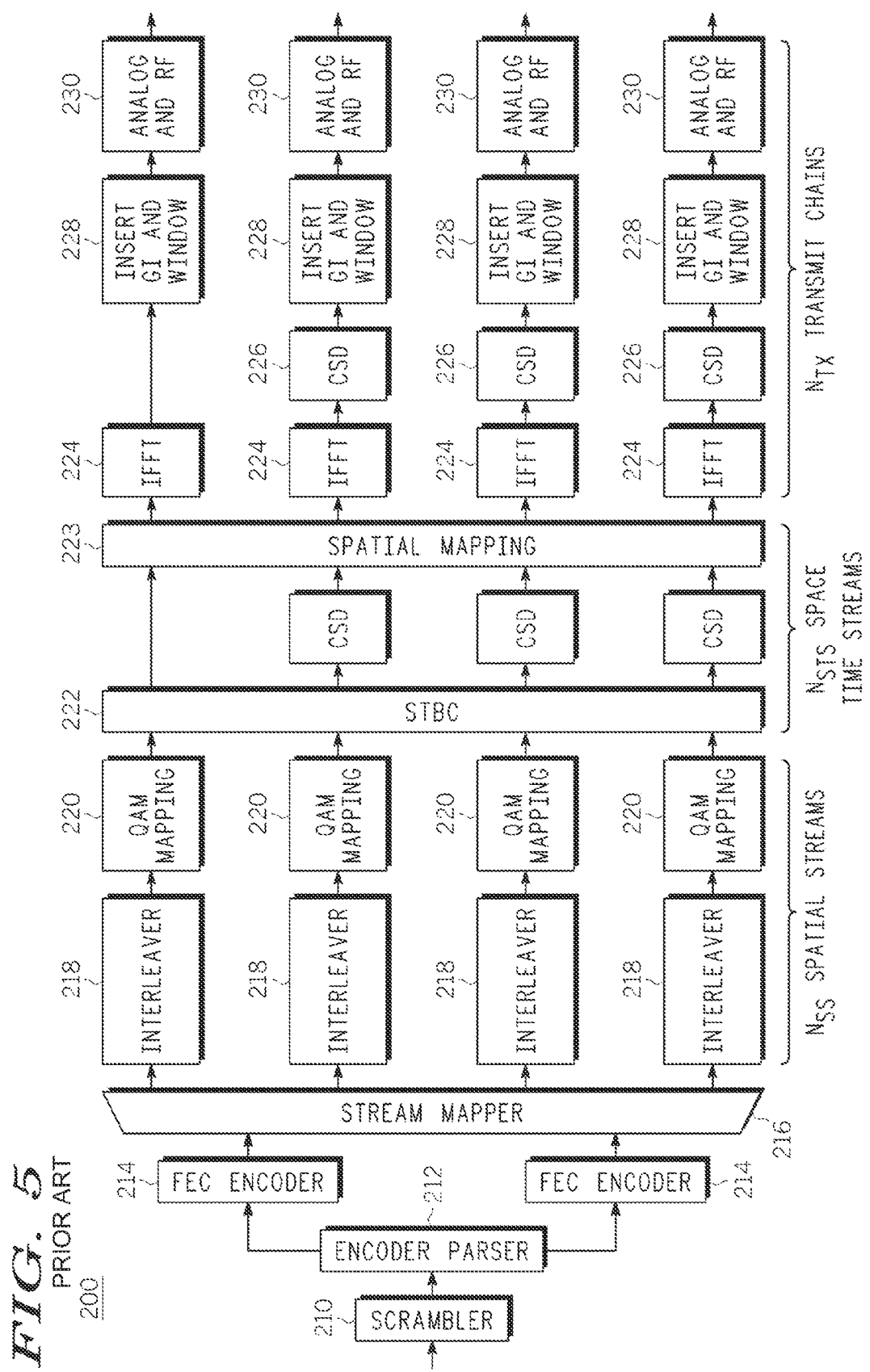
FIG. 5 shows one example of a MIMO Transmitter.

FIG. 5 shows one example of a MIMO Transmitter 200. The MIMO transmitter 200 includes a scrambling block 210 for scrambling the data at the bit level to prevent long strings of zeros or ones, an encoder parsing block 212 for demultiplexing the scrambled bits among $N_{ES}$ FEC encoders, and $N_{ES}$ FEC encoding blocks 214 for encoding the data to enable error correction. A stream parsing block 216 receives divides the output from the FEC encoding blocks 214 into blocks that will be sent to different interleaver and mapping devices. The sequences of the bits sent to the interleaver are called spatial streams. The number of spatial streams is denoted NSS. Interleaver blocks 218 interleave the bits of each spatial stream to prevent long sequences of noisy bits from entering the FEC decoder. QAM mapping blocks 220 map the sequence of bits in each spatial stream to constellation points. A space time block coder (STBC) 222 maps the NSS spatial streams to different transmit chains by providing $N_{STS}$ space time streams. The number of transmit chains is denoted $N_{TX}$. Optionally, a spatial mapping block 223 may receive the spatial streams from the STBC 222. The spatial mapping block 223 can perform direct mapping, spatial expansion (to transmit the $N_{STS}$ streams over $N_{TX}$ antennas using an open-loop solution), space time block coding (STBC) and beam forming (to transmit the $N_{STS}$ space time streams over $N_{TX}$ antennas using some knowledge of the channel between the transmitter and the receiver). Inverse fast Fourier transform block 224 convert a block of constellation points to a time domain block. Cyclic shift insert blocks 226 insert the cyclic shift into each of the time domain blocks and guard interval insertion blocks 228 insert the guard interval into each time domain block. The guard interval insertion blocks 228 may include windowing to smooth the edges of each symbol to increase spectral decay. Finally, the symbols are forwarded to an analog front end 230 for modulating the spatially expanded space-time streams onto a wireless carrier.

The spatial mapping block allows the transmission of $N_{STS}$ space-time streams on $N_{TX}$ antennas, with $N_{TX}$ greater than or equal to $N_{STS}$. The spatial mapping operation is characterized by a matrix that can vary from one subcarrier to another and that is composed of two submatrices, one characterizing the spatial mapping applied to the $1^{st}$ part of the LTFs and to the data, and the second one characterizing the spatial mapping applied to the $2^{nd}$ part of the LTFs In particular, The mapping between space time streams and transmit chains is defined by the columns of an antenna map matrix $Q_k$ for subcarrier k. The first $N_{STS}$ columns define the spatial mapping applied to the DLTFs and used for data transmission and the next $N_{ESS}$ columns (up to $N_{TX}-N_{STS}$ columns) define the spatial mapping applied to the ELTFs. Thus, for the purpose of defining the HT-LTFs, $Q_k$ is an $N_{TX} \times (N_{STS}+N_{ESS})$ dimension matrix. Columns $1 \ldots N_{STS}$ of $Q_k$ are excited by the DLTFs and columns $N_{STS}+1 \ldots N_{STS}+N_{ESS}$ are excited by the ELTFs, where $N_{STS}+N_{ESS} \leq N_{TX}$ is the total number of spatial streams being probed by the HT-LTFs.

In accordance with the IEEE 802.11n standard, at a minimum, the number of HT-LTFs that are transmitted should be equal to the number of space time streams that are transmitted. In this way computation of the space equalization can be achieved at the receiver When the number of spatial streams Nss is less that than the number of transmit antennas $N_{TX}$, there are not enough HT-LTFs to allow the receiver to recover a full characterization of the MIMO channel, even though the resulting MIMO channel measurement is sufficient for receiving the HT-data. However, in some cases it is desirable to obtain as full a characterization of the channel as possible, thus requiring the transmission of a sufficient number of HT-LTFs to sound (i.e., measure channel characteristics using training symbols) the full dimensionality of the channel. MIMO channel measurement performed in this manner is referred to as MIMO channel sounding. The available channel dimension may be probed by a sounding PPDU.

The combination of the DLTFs and ELTFs only lead to a full characterization of the channel if the spatial expansion matrix is formed of orthogonal columns with the same norm. Unfortunately, this prevents the use of sounding PPDUs with a number of different spatial expansion schemes that are important to ensure the use of open-loop range extension. Such spatial expansion schemes include, for example, the transmission of space time block coding over 3 or 4 antennas, with simple duplication of 1 or 2 space-time streams combined with cyclic shift diversity. Another example of such a spatial transmission scheme includes the transmission of 2 or 3 space-time streams using SDM, again with simple duplication of 1 or 2 space-time streams combined with cyclic shift diversity.

As detailed below, a method and apparatus are provided to allow sounding PPDUs to achieve open-loop range extension when the overall matrix of spatial mapping is not formed of orthogonal columns with same norm. To accomplish this, a long range spatial expansion scheme is applied to the data, combined with the application of an appropriate extension scheme to the ELTFs in order to probe additional dimensions of the channel. The design of both schemes is made conjointly to enable a low complexity characterization of the full channel after estimation of the sub-channels experienced by the DLTFs and the ELTFs. These schemes are characterized by the spatial expansion matrix $Q_D$ that is applied to the data and to the DLTFs. They are also characterized by the extension matrix $Q_E$ that is applied to the ELTFs. These matrices, which must be known at the receiver, may include cyclic shift diversity and they may differ from sub-carrier to sub-carrier. The overall matrix formed from the spatial expansion matrix and the extension matrix need not be formed of orthogonal columns that have the same norm.

Figure 1:
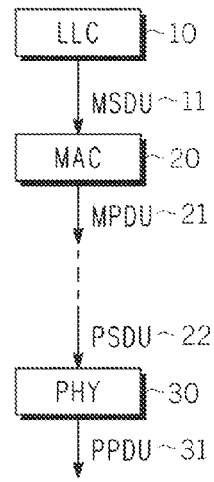
FIG. 1 shows the LLC, MAC and PHY layers of the OSI model, along with the IEEE 801.11 a/g/n frames with which they are associated.
Figure 6:
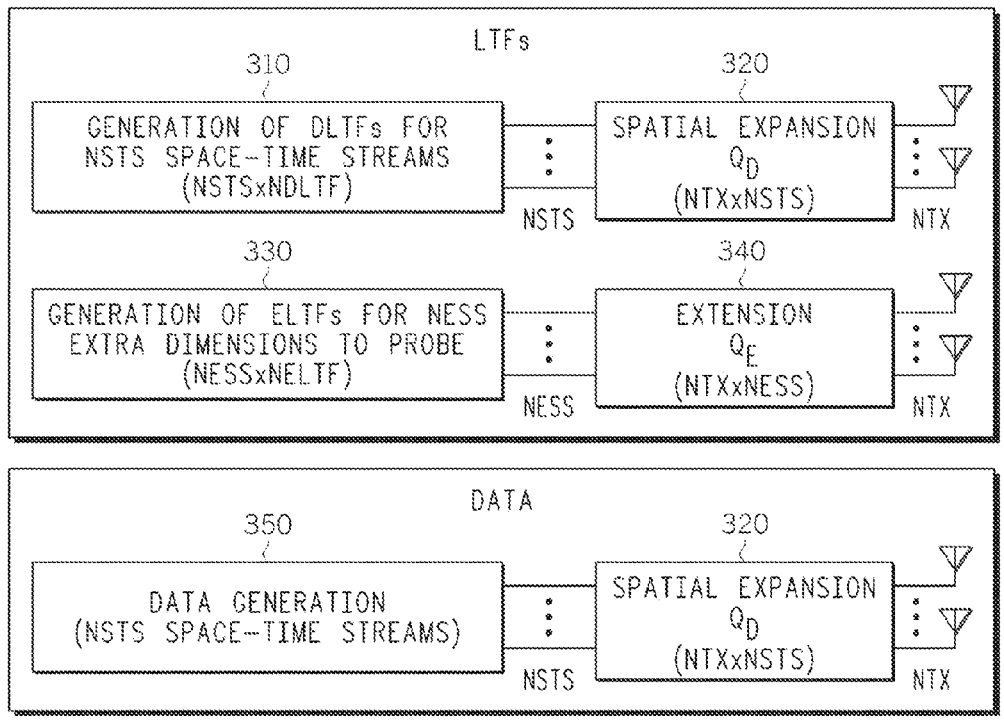
FIG. 6 shows the pertinent portions of the MIMO transmitter depicted in FIG. 5 that generate the DLTFs and ELTFs as well as the data portion of the PPDU packet.

FIG. 6 shows the pertinent portions of a MIMO transmitter that generates the DLTFs and ELTFs as well as the data portion of the PPDU in accordance with the techniques described herein. Preamble generation block 310 generates $N_{DLTF}$ DLTFs and incorporates them into each of the $N_{STS}$ space time streams. Spatial mapping block 320 (e.g., spatial mapping block 223 in FIG. 5) receives the $N_{STS}$ time streams and generates the $N_{TX}$ transmit chains using the spatial expansion matrix $Q_D$. Likewise, preamble generation block 330 generates $N_{ESS}$ ELTFs for each of the $N_{ESS}$ extra dimensions to be probed. Spatial mapping block 340 receives the $N_{ESS}$ spatial streams and, using the spatial expansion matrix $Q_E$, incorporates them into the $N_{TX}$ transmit chains. Also shown in FIG. 5 is data generation block 350, which generates the data that will be incorporated into each of the $N_{STS}$ space time streams. The spatial mapping block 320 receives the $N_{STS}$ data time streams and again incorporates them into the $N_{TX}$ transmit chains using the spatial expansion matrix $Q_D$.

The number $N_{DLTF}$ of Data LTFs and the number $N_{ELTF}$ of Extension LTFs are respectively determined by the number $N_{STS}$ of Space-Time Streams and the number $N_{ESS}$ of extra spatial dimensions that are to be probed. That is, as shown in the table below for the case where $N_{LTF}$ does not exceed 5, the number of data and Extension LTFs are a function of either the number of space time streams $N_{STS}$ or the number of extension spatial streams $N_{ESS}$.

| $N_{STS}$ or $N_{ESS}$ | $N_{DLTF}$ or $N_{ELTF}$ |
| --- | --- |
| 1 | 1 |
| 2 | 2 |
| 3 | 4 |
| 4 | 4 |

The LTFs are designed to enable use of low complexity channel estimators by using a single symbol that is replicated with different weights and delays. This LTF symbol is transmitted with the appropriate weights and delays during $N_{ETF}=N_{DLTF}+N_{ELTF}$ symbol times over the $N_{STS}+N_{ESS}$ dimensions that are to be probed. The appropriate weights for the channel estimation of the $N_{STS}$ (resp. $N_{ESS}$) dimensions using $N_{DLTF}$ (resp. $N_{ELTF}$) symbols are determined by the $N_{STS} \times N_{DLTF}$ (resp. $N_{ESS} \times N_{ELTF}$) top left submatrix $\tilde{P}_{NSTS}$ extracted from the HT-LTF mapping matrix $P_{HTLTF}$:

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Throughout the HT-SIG, HT-STF and HT-LTF fields, cyclic shift is applied to prevent beamforming when similar signals are transmitted in different spatial streams. The same cyclic shift is also applied to these streams during the transmission of the data portion of the PPDU. The cyclic shift values to be used during these High-Throughput portions of the PPDU packet are specified by IEEE802.11n draft specification as follows:

| $N_{STS}$ | Cyclic shift value for STS 1 | Cyclic shift value for STS 2 | Cyclic shift value for STS 3 | Cyclic shift value for STS 4 |
|---|---|---|---|---|
| 1 | 0 ns | — | — | — |
| 2 | 0 ns | −400 ns | — | — |
| 3 | 0 ns | −400 ns | −200 ns | — |
| 4 | 0 ns | −400 ns | −200 ns | −600 ns |

At the receiver, channel estimation is performed to the signal that is observed during the transmission of the DLTFs. Channel estimation is performed as follows. For each receive antenna and each subcarrier, the signal received during $N_{DLTF}$ symbol times to estimate $N_{STS}$ streams can be written as:

$$Y = HC\tilde{P}s + \text{noise} \quad \text{or} \quad Y^T = s\tilde{P}^T CH^T + \text{noise},$$

where s is the BPSK symbol on this given subcarrier of the known training sequence, $\tilde{P}_{NSTS}$ corresponds to the weights applied to this symbol, C ($N_{STS} \times N_{STS}$) denotes the diagonal matrix related to the cyclic shifts applied to the DLTFs, and H (1×$N_{STS}$) is the channel to be estimated.

Zero-Forcing channel estimation in the frequency domain can then performed by applying the channel estimator $$G_{NSTS} = (s\tilde{P}^T C)^+ = s^* C^* (\tilde{P}\tilde{P}^T)^{-1} \tilde{P}$$

to the received vector $Y^T$ to get the channel estimate:

$$\hat{H}^T = G_{NSTS} Y^T$$

This equation can be rewritten as:

$$\hat{H} = Y G_{NSTS}^T$$

$G_{NSTS}$ defines a class of generic estimators to estimate 1, 2, 3 or 4 equivalent channels. These equivalent channels may correspond to the exact channels if no spatial expansion is applied to the LTFs or to the channels experienced by the data LTFs ($HQ_D$) or the Extension LTFs ($HQ_E$) if segmented LTFs are applied.

At the receiver, the channel estimator $G_{NSTS}$ is applied to the signal observed during the transmission of the DLTFs, which provides an estimate of $HQ_D$ that corresponds to the channel experienced by the data and which will be used for decoding of the data. Similarly, the channel estimator $G_{NESS}$ is applied to the signal observed during the transmission of the ELTFs, which gives an estimate of $HQ_E$. Note that these operations use the estimators that are already implemented for estimation of 1, 2, 3 or 4 channels.

The exact channel H can then be recovered from the concatenation of the estimated channels: [$HQ_D$ $HQ_E$]=HQ with Q=[$Q_D$ $Q_E$], if the matrix $Q_E$ is chosen such that the matrix Q has orthogonal columns. The receiver can then feedback to the transmitter CSI matrices, non compressed steering matrices or compressed steering matrices, in order to perform beamforming during subsequent data transmission.

Several illustrative Spatial Expansion schemes for long range sounding PPDUs are presented in FIG. 7. These schemes correspond to the simple duplication of one or two of the STS, and can be applied to the transmission of 2 STS SDM or STBC on 3 or 4 transmit antennas, or to the transmission of 3 STS SDM on 4 antennas. In this case the columns of the matrix $Q_D$ form an orthogonal basis, but do not have the same norm. The techniques presented above allow these long range Spatial Expansion schemes to be applied to sounding PPDUs. For each Spatial Expansion scheme, the illustrative spatial expansion schemes are characterized by a matrix $Q_E$ such that the resulting overall matrix Q=[$Q_D$ $Q_E$] can be easily inverted to recover the exact channel H. The inverse of this matrix is also given for each scheme in FIG. 8.

Figure 8:
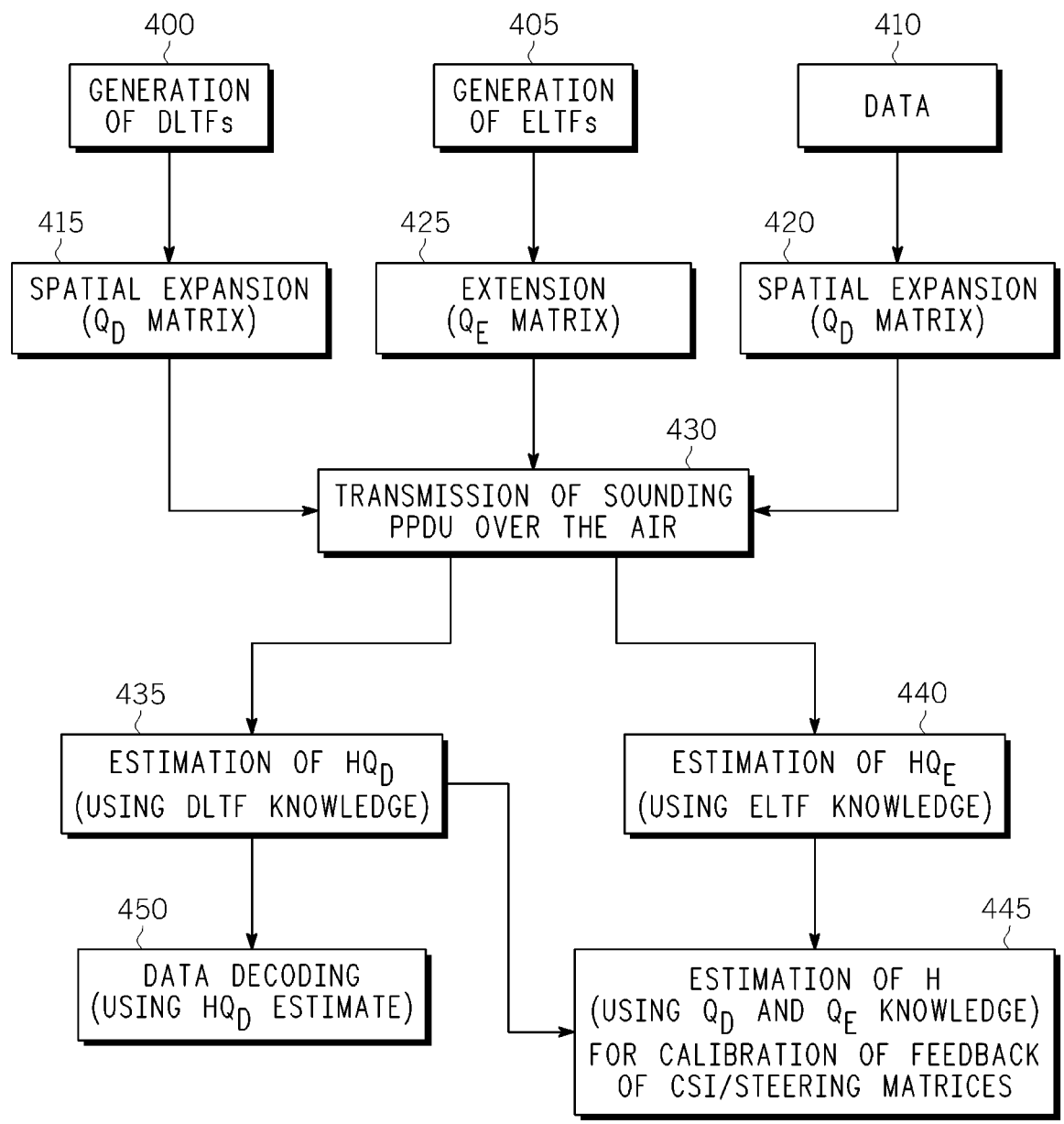
FIG. 8 is a flowchart showing one example of the pertinent steps performed by a MIMO transmitter and receiver when using sounding PPDUs such as shown in FIG. 7.

FIG. 8 is a flowchart showing one example of the pertinent steps performed by the MIMO transmitter and receiver. In step 400 the transmitter generates the DLTF symbols that are incorporated in the PPDU frame or packet. Likewise, in steps 405 and 410 the transmitter generates the ELTF symbols and the data symbols, respectively, which are also incorporated in the PPDU frame or packet. In step 415 the transmitter (e.g., spatial mapping block 223 in the transmitter of FIG. 5) applies the spatial expansion matrix $Q_D$ to the DLTF symbols. Similarly, in step 420 the transmitter applies the spatial expansion matrix $Q_D$ to the data symbols. In step 425, however, the transmitter applies the extension matrix $Q_E$ to the ELTF symbols. Once the packet is completed with the addition of the appropriate higher level frames (e.g., LLC and MAC frames), the packet can be transmitted in step 430 by, e.g., analog front-end 230 in the transmitter of FIG. 5). At the receiver, the packet undergoes processing to estimate the values for $HQ_D$ and $HQ_E$. Specifically, in step 435 the receiver uses the known values for $Q_D$ and the known DLTF symbols to estimate the value for $HQ_D$, from which the data can be decoded in step 450. Likewise, in step 440 the receiver uses the known values for $Q_E$ and the known ELTF symbols to estimate the value of $HQ_E$. Finally, in step 445 the receiver uses the estimated value of $HQ_D$ and $HQ_E$ to estimate the channel transfer function H itself. As previously mentioned, the channel transfer function H may be used to calibrate the receiver and/or to provide feedback (e.g., CSI matrices or steering matrices) to the transmitter so that beamforming may be employed during subsequent transmissions between the transmitter and receiver.

Although a specific architecture has been described in connection with FIGS. 5-6 herein, including specific functional elements and relationships, it is contemplated that the systems and methods herein may be implemented in a variety of ways. For example, functional elements may be packaged together or individually, or may be implemented by fewer, more or different devices, and may be either integrated within other products, or adapted to work with other products externally. When one element is indicated as being responsive to another element, the elements may be directly or indirectly coupled.

The processes described above, including that shown in FIG. 8, may be implemented in a general, multi-purpose or single purpose processor. Such a processor will execute instructions, either at the assembly, compiled or machine-level, to perform that process. Those instructions can be written by one of ordinary skill in the art following the descriptions herein and stored or transmitted on a computer readable medium. The instructions may also be created using source code or any other known computer-aided design tool. A computer readable medium may be any medium capable of carrying those instructions and includes a CD-ROM, DVD, magnetic or other optical disc, tape, silicon memory (e.g., removable, non-removable, volatile or non-volatile), packetized or non-packetized wireline or wireless transmission signals.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A wireless transmitter, comprising:
   a stream parser for generating a plurality of spatial streams from a digital signal;

a space time block coder (STBC) for mapping each of the spatial streams to a plurality of space-time streams that each include data and a preamble for estimating a channel transfer function;

a spatial mapper for spatially expanding each of the space-time streams by applying a spatial expansion matrix to data and to first training symbols used in the preamble to probe a channel experienced by the data and by applying an extension matrix to second training symbols used in the preamble to probe at least one additional dimension of the channel to enable use of beamforming to achieve range extension, wherein the spatial expansion matrix and the extension matrix form an overall matrix that has at least two orthogonal columns with different norms; and an analog front end for modulating the spatially expanded space-time streams onto a wireless carrier.

2. The wireless transmitter of claim 1 wherein the number of space-time streams is equal to 2 and a number of transmit chains is equal to 3, and wherein the spatial expansion matrix $Q_D$ and the extension matrix $Q_E$ are as follows:

$$D_{1,1,e^{j\theta k}} \overbrace{\begin{bmatrix} 1 & 0 \\ 0 & 1 \\ 1 & 0 \end{bmatrix}}^{Q_D} \sqrt{\frac{2}{3}} \quad D_{1,1,e^{j\theta k}} \overbrace{\begin{bmatrix} -1 \\ 0 \\ 1 \end{bmatrix}}^{Q_E} \frac{1}{\sqrt{2}}$$

$$D_{\alpha_1,\ldots,\alpha_n} = \mathrm{diag}(\alpha_1, \ldots, \alpha_n)$$

is a diagonal matrix $\theta_k = -2\pi k \Delta_F \tau_{CS}$ where $\Delta_F$ is the subcarrier frequency spacing and $\tau_{CS}$ is related to a delay applied to a transmit chain.

3. The wireless transmitter of claim 1 wherein the number of space-time streams is equal to 2 and a number of transmit chains is equal to 4, and wherein the spatial expansion matrix $Q_D$ and the extension matrix $Q_E$ are as follows:

$$D_{1,1,e^{j\theta k},e^{j\theta k}} \overbrace{\begin{bmatrix} 1 & 0 \\ 0 & 1 \\ 1 & 0 \\ 0 & 1 \end{bmatrix}}^{Q_D} \frac{1}{\sqrt{2}} \quad D_{1,1,e^{j\theta k},e^{j\theta k}} \overbrace{\begin{bmatrix} -1 & 0 \\ 0 & -1 \\ 1 & 0 \\ 0 & 1 \end{bmatrix}}^{Q_E} \frac{1}{\sqrt{2}}$$

$$D_{\alpha_1,\ldots,\alpha_n} = \mathrm{diag}(\alpha_1, \ldots, \alpha_n)$$

is a diagonal matrix $\theta_k = -2\pi k \Delta_F \tau_{CS}$ where $\Delta_F$ is the subcarrier frequency spacing and $\tau_{CS}$ is related to a delay applied to a transmit chain.

4. The wireless transmitter of claim 1 wherein the number of space-time streams is equal to 3 and a number of transmit chains is equal to 4, and wherein the spatial expansion matrix $Q_D$ and the extension matrix $Q_E$ are as follows:

$$D_{1,1,1,e^{j\theta k}} \overbrace{\begin{bmatrix} 1 & 0 & 0 \\ 0 & 1 & 0 \\ 0 & 0 & 1 \\ 1 & 0 & 0 \end{bmatrix}}^{Q_D} \frac{\sqrt{3}}{2} \quad D_{1,1,1,e^{j\theta k}} \overbrace{\begin{bmatrix} -1 \\ 0 \\ 0 \\ 1 \end{bmatrix}}^{Q_E} \frac{1}{\sqrt{2}}$$

$$D_{\alpha_1,\ldots,\alpha_n} = \mathrm{diag}(\alpha_1, \ldots, \alpha_n)$$

is a diagonal matrix $\theta_k = -2\pi k \Delta_F \tau_{CS}$ where $\Delta_F$ is the subcarrier frequency spacing and $\tau_{CS}$ is related to a delay applied to a transmit chain.

5. The wireless transmitter of claim 1 wherein the STBC is further configured to apply cyclic shifts to each transmit chain.

6. The wireless transmitter of claim 1 wherein the spatial streams generated by the stream parser include sounding physical layer protocol data units (PPDUs) that are used to measure channel characteristics.

7. The wireless transmitter of claim 6 wherein the sounding PPDUs are compatible with IEEE 802.11 standards.

8. A non-transitory computer-readable medium encoded with instructions which, when executed by a processor, performs a method including:

dividing a digital signal into a plurality of spatial streams;

mapping the spatial streams into a plurality of space-time streams that each include data and a preamble for estimating a channel transfer function;

spatially mapping the space time streams by applying a spatial expansion matrix to data and to first training symbols used in the preamble to probe a channel experienced by the data and by applying an extension matrix to second training symbols used in the preamble to probe at least one additional dimension of the channel to enable use of beamforming to achieve range extension, wherein the spatial expansion matrix and the extension matrix form an overall matrix that has at least two orthogonal columns with different norms; and wirelessly transmitting each of the spatially mapped space-time streams.

9. The non-transitory computer-readable medium of claim 8 wherein the number of space-time streams is equal to 2 and a number of transmit chains is equal to 3, and wherein the spatial expansion matrix $Q_D$ and the extension matrix $Q_E$ are as follows:

$$D_{1,1,e^{j\theta k}} \overbrace{\begin{bmatrix} 1 & 0 \\ 0 & 1 \\ 1 & 0 \end{bmatrix}}^{Q_D} \sqrt{\frac{2}{3}} \quad D_{1,1,e^{j\theta k}} \overbrace{\begin{bmatrix} -1 \\ 0 \\ 1 \end{bmatrix}}^{Q_E} \frac{1}{\sqrt{2}}$$

$$D_{\alpha_1,\ldots,\alpha_n} = \mathrm{diag}(\alpha_1, \ldots, \alpha_n)$$

is a diagonal matrix $\theta_k = -2\pi k \Delta_F \tau_{CS}$ where $\Delta_F$ is the subcarrier frequency spacing and $\tau_{CS}$ is related to a delay applied to a transmit chain.

10. The non-transitory computer-readable medium of claim 8 wherein the number of space-time streams is equal to 2 and a number of transmit chains is equal to 4, and wherein the spatial expansion matrix $Q_D$ and the extension matrix $Q_E$ are as follows:

$$D_{1,1,e^{j\theta k},e^{j\theta k}} \overbrace{\begin{bmatrix} 1 & 0 \\ 0 & 1 \\ 1 & 0 \\ 0 & 1 \end{bmatrix}}^{Q_D} \frac{1}{\sqrt{2}} \quad D_{1,1,e^{j\theta k},e^{j\theta k}} \overbrace{\begin{bmatrix} -1 & 0 \\ 0 & -1 \\ 1 & 0 \\ 0 & 1 \end{bmatrix}}^{Q_E} \frac{1}{\sqrt{2}}$$

$$\alpha_1, \overset{D}{\ldots}, \alpha_n = \text{diag}(\alpha_1, \ldots, \alpha_n)$$

is a diagonal matrix $\theta_k = -2\pi k \Delta_F \tau_{CS}$ where $\Delta_F$ is the subcarrier frequency spacing and $\tau_{CS}$ is related to a delay applied to a transmit chain.

11. The non-transitory computer-readable medium of claim 8 wherein the number of space-time streams is equal to 3 and a number of transmit chains is equal to 4, and wherein the spatial expansion matrix $Q_D$ and the extension matrix $Q_E$ are as follows:

$$D_{1,1,1,e^{j\theta k}} \overbrace{\begin{bmatrix} 1 & 0 & 0 \\ 0 & 1 & 0 \\ 0 & 0 & 1 \\ 1 & 0 & 0 \end{bmatrix}}^{Q_D} \frac{\sqrt{3}}{2} \quad D_{1,1,1,e^{j\theta k}} \overbrace{\begin{bmatrix} -1 \\ 0 \\ 0 \\ 1 \end{bmatrix}}^{Q_E} \frac{1}{\sqrt{2}}$$

$$\alpha_1, \overset{D}{\ldots}, \alpha_n = \text{diag}(\alpha_1, \ldots, \alpha_n)$$

is a diagonal matrix $\theta_k = -2\pi k \Delta_F \tau_{CS}$ where $\Delta_F$ is the subcarrier frequency spacing and $\tau_{CS}$ is related to a delay applied to a transmit chain.

12. The non-transitory computer-readable medium of claim 8 further comprising applying cyclic shifts to each transmit chain.

13. The non-transitory computer-readable medium of claim 8 wherein the spatial streams include sounding physical layer protocol data units (PPDUs) that are used to measure channel characteristics.

14. The non-transitory computer-readable medium of claim 13 wherein the sounding PPDUs are compatible with IEEE 802.11 standards.

15. A non-transitory computer-readable medium encoded with instructions which, when executed by a processor, performs a method including:

receiving a wireless signal that includes a preamble used to estimate a channel transfer function H of a channel experienced by the wireless signal during transmission thereof, wherein the preamble includes first training symbols to which a spatial expansion matrix $Q_D$ is applied and second training symbols to which an extension matrix $Q_E$ is applied, wherein the first training symbols probe the channel experienced by the wireless signal and the second training symbols probe at least one additional dimension of the channel and wherein the spatial expansion matrix $Q_D$ and the extension matrix $Q_E$ form an overall matrix that has at least two orthogonal columns with different norms;

estimating values for $HQ_E$ and $HQ_D$ using known values for $Q_D$ and $Q_E$; and obtaining a value for the channel transfer function H from the estimated values of $HQ_E$ and $HQ_D$.

16. The non-transitory computer-readable medium of claim 15 further comprising forwarding to a source of the wireless signal channel state information acquired from the value of the channel transfer function to enhance the signal quality of wireless signal.

17. The non-transitory computer-readable medium of claim 16 wherein the channel state information is sufficient to allow use of beamforming at the source.

18. The non-transitory computer-readable medium of claim 16 wherein the channel state information is sufficient to use for calibration to thereby restore reciprocity between downlink and uplink channels.

19. The non-transitory computer-readable medium of claim 15 wherein the spatial expansion matrix $Q_D$ is a matrix having columns orthogonal to one another and the channel transfer function H is obtained from the relation $[HQ_D \; HQ_E] = HQ$, where $Q = [Q_D Q_E]$.

* * * * *